(12) United States Patent
Murata

(10) Patent No.: US 8,153,291 B2
(45) Date of Patent: Apr. 10, 2012

(54) POWER SUPPLY DEVICE

(75) Inventor: Takashi Murata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 833 days.

(21) Appl. No.: 12/297,843

(22) PCT Filed: Jan. 9, 2008

(86) PCT No.: PCT/IB2008/000027
§ 371 (c)(1),
(2), (4) Date: Oct. 20, 2008

(87) PCT Pub. No.: WO2008/093181
PCT Pub. Date: Aug. 7, 2008

(65) Prior Publication Data
US 2009/0068552 A1    Mar. 12, 2009

(30) Foreign Application Priority Data
Feb. 1, 2007  (JP) .................................. 2007-023589

(51) Int. Cl.
*H01M 10/50*   (2006.01)

(52) U.S. Cl. ....................................... 429/120; 429/100
(58) Field of Classification Search ........... 429/148–162
See application file for complete search history.

(56) References Cited

U.S. PATENT DOCUMENTS
2006/0113965 A1  6/2006  Jeon et al.

FOREIGN PATENT DOCUMENTS

| | | |
|---|---|---|
| GB | 2 295 264 A | 5/1996 |
| JP | 2775600 B | 5/1998 |
| JP | 2959298 B | 7/1999 |
| JP | 2005-019134 A | 1/2005 |
| WO | WO 2005/086851 A2 | 9/2005 |

*Primary Examiner* — Barbara Gilliam
*Assistant Examiner* — Maria J Laios
(74) *Attorney, Agent, or Firm* — Kenyon & Kenyon LLP

(57) ABSTRACT

A plurality of cylindrical power storage bodies are immersed in a cooling liquid filled in a power supply device. The power supply device includes: rotary members that are disposed to surround the respective cylindrical power storage bodies, and that rotate to agitate the cooling liquid around the cylindrical power storage bodies; and drive means for rotating the rotary members.

20 Claims, 7 Drawing Sheets

POWER SUPPLY DEVICE

This is a 371 national phase application of PCT/IB2008/000027 filed 9 Jan. 2008, claiming priority to Japanese Patent Application No. 2007-023589 filed 1 Feb. 2007, the contents of which are incorporated herein by reference.

BACKGROUND OF THE INVENTION

1. Field of the Invention

The invention relates to a power supply device, more specifically, to a cooling control for the power supply device.

2. Description of the Related Art

Power storage bodies, such as battery cells or capacitors, in a power supply device generate heat at the time of charging/discharging. A power storage body, such as a fuel cell or a capacitor in a power supply device, generates heat at the time of charging/discharging. Therefore, by cooling the power storage bodies using a cooling device provided in the power supply device, the temperature of the entire power supply device is controlled to make the output from the power storage bodies constant, to extend the lifetime of the power storage bodies, and to supply constant electric power.

Examples of a method of cooling the power supply device (the power storage bodies) include a gaseous cooling method and a liquid cooling method. In these cooling methods, heat transferred from the power storage bodies to a gaseous or liquid cooling medium is transferred to a casing constituting a part of the power supply device, and then is discharged from the power supply device. The gaseous cooling medium used in the gaseous cooling method is easier to handle than the liquid cooling medium used in the liquid cooling method. However, the gaseous cooling medium has lower heat conductivity than that of the liquid cooling medium. In contrast, in the liquid cooling method, the liquid cooling medium needs to be carefully handled. For example, a sealing mechanism needs to be provided to prevent leaking of the cooling liquid from the power supply device. However, the liquid cooling medium cools the power supply device (the power storage bodies) more efficiently than the gaseous cooling medium, because the liquid cooling medium has significantly higher heat conductivity than that of the gaseous cooling medium.

In recent years, a power supply device, such as a secondary battery or an electric double-layer capacitor (condenser), has been employed as a battery for a hybrid vehicle and an electric vehicle. In such a power supply device, a plurality of power storage bodies are disposed close together to make the power supply device compact. Thus, the power supply device can output high electric power. Therefore, in most cases, the liquid cooling method is employed, and thus the liquid cooling medium having high heat conductivity is used so that the heat inside the power storage bodies disposed close together is efficiently discharged from the outer peripheries of the power storage bodies.

When the liquid cooling method is employed, the cooling liquid is filled in a casing that constitutes a part of the power supply device, and the plurality of power storage bodies are disposed in the casing in which the cooling liquid is filled. A lid member seals the cooling liquid and a power storage module including the plurality of power storage bodies, in the casing. When the power storage bodies generate heat due to charging/discharging, the heat is transferred to the cooling liquid, and then the heat is transferred from the cooling liquid to the casing. Then, the heat is discharged from the power supply device. At this time, convection (natural convection) of the cooling liquid occurs in the sealed casing, as in the case of gas. The heat generated in the power storage bodies is discharged from the power supply device due to the effect of the convection, and the heat conductivity of the cooling liquid.

As described above, the heat conductivity and the convection of the liquid are main factors for improving the cooling efficiency in the liquid cooling method. For example, as described in Japanese Patent Application Publication No. 2005-19134 (JP-A-2005-19134), the technology, in which a cooling liquid in a power supply device is forcibly circulated by a pump to improve cooling efficiency through the forced convention, has been proposed. Further, Japanese Patent No. 2775600 (JP-B-2775600) and Japanese Patent Application Publication No. 9-266016 (JP-A-9-266016) describe similar technologies.

In the power supply device in which the plurality of power storage bodies are provided, if performance varies among the power storage bodies, the lifetime of an entire power storage device is decreased. More specifically, if the temperature of the cooling liquid around the power storage bodies varies depending on the portion of the cooling liquid, the cooling liquid has a strong cooling effect on a part of the plurality of power storage bodies, and has a weak cooling effect on another part of the plurality of power storage bodies. Thus, the deterioration rate varies among the power storage bodies. This decreases the lifetime of the power supply device.

Accordingly, in the technologies described in the JP-A-2005-19134, the JP-B-2775600, and the JP-A-9-266016 as described above, a cooling liquid is forcibly circulated (such that the cooling liquid flows into a battery apparatus through an inlet, and discharged from the battery apparatus through an outlet). However, in the power supply device in which the plurality of power storage bodies are disposed close together, the cooling liquid is not sufficiently circulated among the power storage bodies disposed close together. Therefore, for example, the temperature of the cooling liquid in areas among the power storage bodies differs from the temperature of the cooling liquid at the outer peripheries of the power storage bodies, and thus the power storage bodies cannot be appropriately cooled. Therefore, the lifetime of the power supply device is decreased.

SUMMARY OF THE INVENTION

The invention provides a power supply device in which variation in the temperature of a cooling liquid is reduced.

A first aspect of the invention relates to a power supply device in which a plurality of cylindrical power storage bodies are disposed in a casing that houses a cooling liquid. The power supply device includes at least one rotary member that rotates. Each of the at least one rotary member is disposed to surround at least one of the cylindrical power storage bodies.

In the first aspect, the power supply device may further include drive means for rotating the rotary members. In the power supply device, the rotary members may be provided for the respective cylindrical power storage bodies; and each of the rotary members may include drive power transmission means for transmitting rotational drive power from one of each pair of the adjacent rotary members to the other rotary member.

In the aforementioned aspect, the drive means may rotate at least one of the rotary members, and the at least one rotary member rotated by the drive means may rotate the other rotary members through the drive power transmission means.

In the aforementioned aspect, the rotary members may be arranged in parallel with each other; the drive means may rotate the rotary member disposed adjacent to the drive means, among the rotary members arranged in parallel with each other; and the rotary member disposed adjacent to the drive means may rotate the other rotary members through the drive power transmission means. Further, in the aforementioned aspect, the rotary members may be arranged in parallel and in a plurality of rows, and the rotary members may be rotated by the single drive means.

Further, in the aforementioned aspect, the rotary members adjacent to each other may rotate in directions opposite to each other.

Further, in the aforementioned aspect, each of the rotary members may be axially supported by electrode portions of the corresponding cylindrical power storage body, and may rotate around the cylindrical power storage body in such a manner that the electrode portions serve as a rotational center. Each of the rotary members may include a rotational axis that is eccentric with respect to an axis of the corresponding cylindrical power storage body, and may eccentrically rotate around the cylindrical power storage body.

Further, in the aforementioned aspect, each of the rotary members may be disposed to surround the corresponding cylindrical power storage body in such a manner that the a space is formed between the rotary member and the corresponding cylindrical power storage body and the cooling liquid flows into the space; and the rotary member may be provided with an opening portion through which the cooling liquid flows into and out from the space. A flow speed of the cooling liquid flowing outside each of the rotary members may differ from a flow speed of the cooling liquid flowing inside the rotary member due to rotation of the rotary member, and the cooling liquid may flow into and out from the space through the opening portion due to a difference between the flow speeds.

In the aforementioned aspect, each of the rotary members may extend in a lengthwise direction of the corresponding cylindrical power storage body, and may be formed by a plurality of cover members that are disposed at predetermined intervals to surround the corresponding cylindrical power storage body.

Further, in the aforementioned aspect, each of the cover members may be formed in such a manner that a distance between the cover member and the corresponding cylindrical power storage body at a first position differs from a distance between the cover member and the corresponding cylindrical power storage body at a second position. Alternatively, each of the cover members may be formed in such a manner that a shape of the cover member at a first position differs from a shape of the cover member at a second position, in a sectional view of the cover member. Alternatively, each of the cover members may include a protrusion portion that protrudes toward a side opposite to a side where the cylindrical power storage body is disposed. Alternatively, each of the cover members may include at least one of a groove and a protrusion, which is formed on at least one of an outer surface and an inner surface of the cover member.

In the aforementioned aspect, the power supply device may further include: a temperature sensor that detects a temperature of an upper portion of the cooling liquid and a temperature of a lower portion of the cooling liquid; and a temperature control portion that drives the drive means when a difference between the temperature of the upper portion and the temperature of the lower portion is equal to a predetermined value.

A second aspect of the invention relates to a power supply device that includes: a power storage module that includes a plurality of cylindrical power storage bodies; a casing that houses the power storage module; a cooling medium that is filled in the casing; a lid member that covers the casing and seals the power storage module and the cooling medium in the casing; rotary members that are disposed to surround the respective cylindrical power storage bodies, and that rotate around the respective cylindrical power storage bodies; and a drive portion that rotates the rotary members.

Further, in the aforementioned aspect, the power supply device may further include: a temperature sensor that detects a temperature of an upper portion of the cooling medium and a temperature of a lower portion of the cooling medium; and a temperature control portion that drives the drive portion when a difference between the temperature of the upper portion and the temperature of the lower portion is equal to a predetermined value.

According to the invention, the variation in the temperature of the cooling liquid (cooling medium) can be reduced. Thus, it is possible to provide the power supply device that is stable and that has a long lifetime.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4A is a perspective view showing the cylindrical power storage bodies and the rotary members, and FIG. 4B is a sectional view of one of the cylindrical power storage bodies and the corresponding rotary member;

DETAILED DESCRIPTION OF EMBODIMENTS

Figure 1:
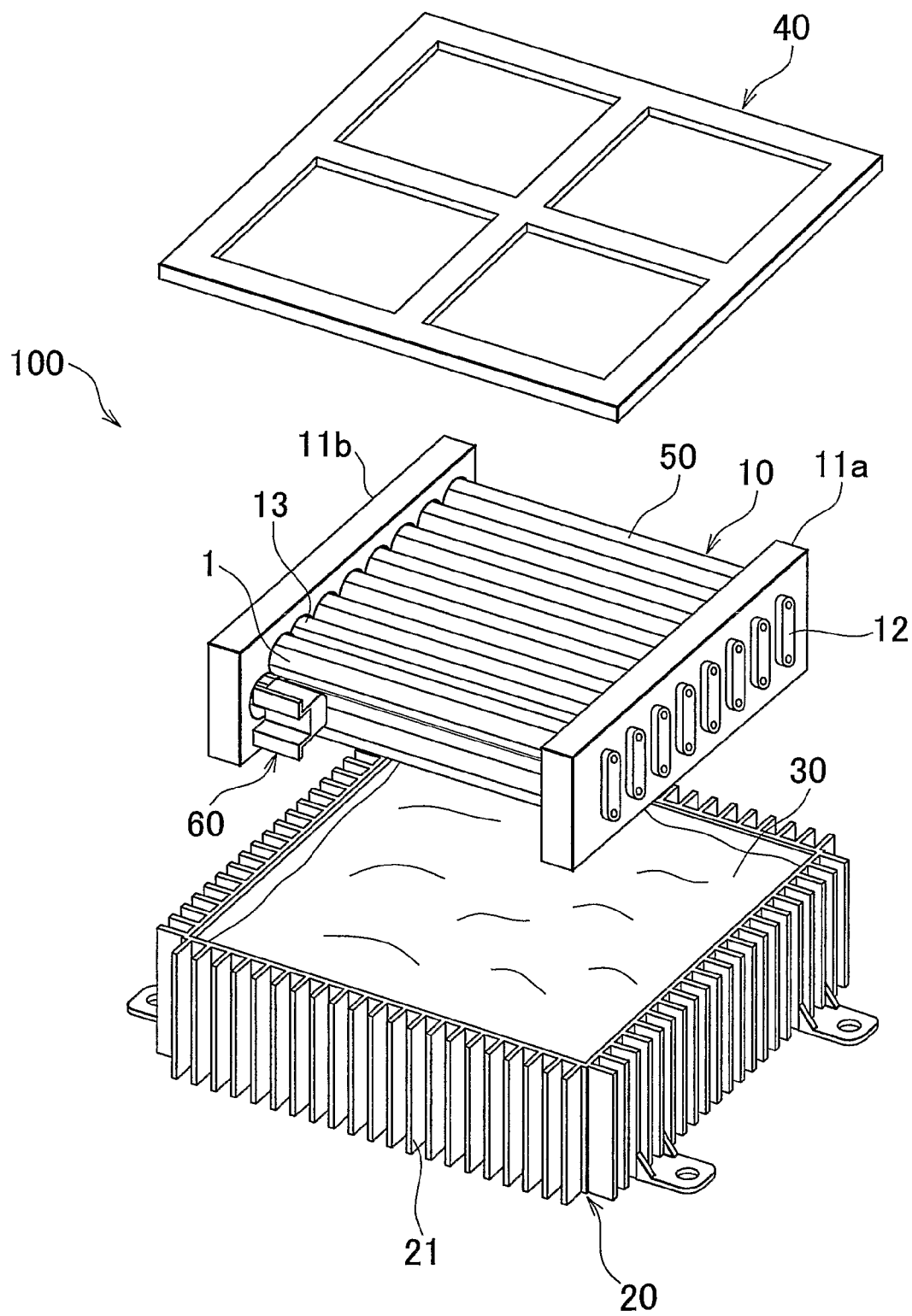
FIG. 1 is an exploded perspective view of a power supply device according to a first embodiment of the invention.

Referring to FIG. 1, A power supply device 100 according to the embodiment of the invention includes a power storage module 10, a casing 20, a cooling medium 30, a lid member 40, rotary members 50, and a motor 60. The power storage module 10 includes a plurality of cylindrical power storage bodies 1. The casing 20 houses the power storage module 10, and is filled with the cooling medium 30. The lid member 40 is placed on top of the casing 20 so as to seal the power storage module 10 and the cooling medium 30 in the casing 20. The rotary members 50 are provided to surround the respective cylindrical power storage bodies 1. The rotary members 50 are provided coaxially with the respective cylindrical power storage bodies 1 to rotate around the respective cylindrical power storage bodies 1. The motor 60 (drive means) rotates the rotary member 50.

In the first embodiment, a cooling liquid, such as cooling oil, is employed as the cooling medium 30 so that the cylindrical power storage bodies 1 (i.e. the power storage module 10) are cooled by a liquid cooling method. Each of the cylindrical power storage bodies 1 may be a battery cell (unit cell) or an electric double layer capacitor (condenser) in which a positive electrode and a negative electrode are stacked, with an electrolyte membrane interposed therebetween.

Figure 3A:
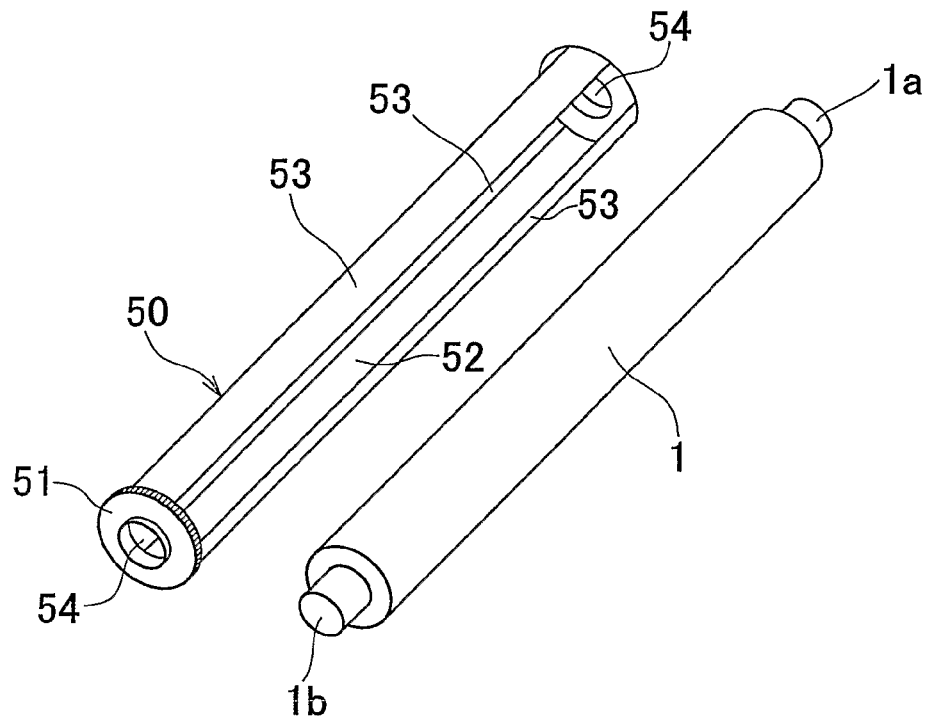
FIGS. 3A, 3B are perspective views showing a cylindrical power storage body and a rotary member according to the first embodiment of the invention.

As shown in FIG. 3A, each of the rotary members 50 includes a plurality of cover members (which function as rotary vanes) 53 and a rotary gear (i.e. drive power transmission means) 51. The cover members 53 extend in a lengthwise direction (i.e., in an axial direction) of the corresponding cylindrical power storage body 1, and are disposed at predetermined intervals to surround the cylindrical power storage body 1. The rotary gear 51 is disposed at one end of the rotary member 50, and is rotated by the drive power produced by the motor 60 to rotate the cover members 53 (i.e. the rotary member 50). The cover members 53 are provided for each cylindrical power storage body 1 so as to surround the cylindrical power storage body 1. Thus, the cover members 53 form the rotary member 50 that is cylindrical, and concentric with the cylindrical power storage body 1. The cover members 53 are also disposed at predetermined intervals in a circumferential direction of the cylindrical power storage body 1. Thus, the cover members 53 form the cylindrical rotary member 50.

Figure 3B:
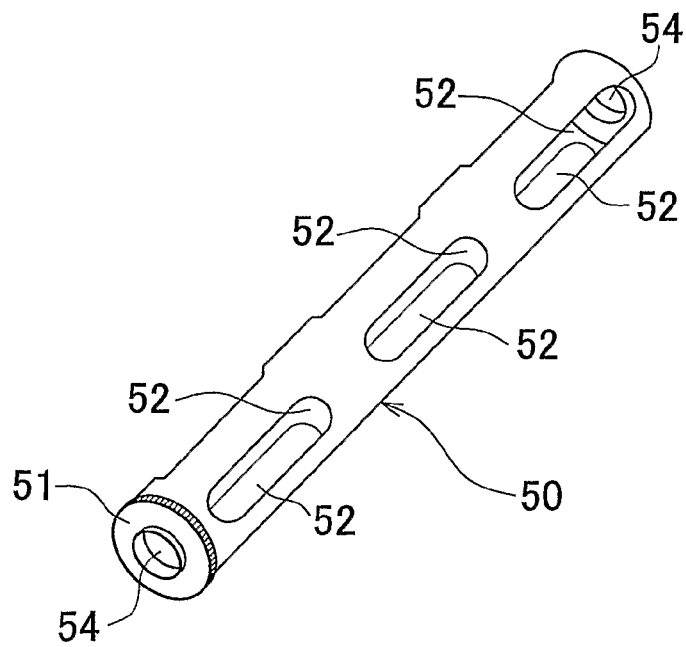

In other words, the rotary member 50 has a diameter larger than that of the cylindrical power storage body 1, and surrounds the cylindrical power storage body 1 in such a manner that a space is formed between the cylindrical power storage body 1 and the rotary member 50 and the cooling liquid flows into the space. The rotary member 50 is formed to be cylindrical, and to have opening portions 52, each of which is equivalent to a clearance between the adjacent cover members 53. As shown in FIG. 3B, the rotary member 50 may be a cylindrical member that has a diameter larger than that of the cylindrical power storage body 1, and includes a plurality of the opening portions 52 on a peripheral surface. The cooling liquid flows into and out from the space between the cylindrical power storage body 1 and the rotary member 50 through the opening portions 52 shown in FIGS. 3A, 3B.

Each of the cylindrical power storage bodies 1 includes electrode portions 1a, 1b that are connected and fixed to retaining members 11a, 11b, respectively. Insertion portions 54, through which the electrode portions 1a, 1b are inserted, are provided at one end of the rotary member 50 at which the rotary gear 51 is not provided, and the other end of the rotary member 50 at which the rotary gear 51 is provided, respectively. The electrode portions 1a, 1b are inserted through the insertion portions 54 of the rotary member 50, respectively, so that the rotary member 50 rotates around the cylindrical power storage body 1. The rotary member 50 is axially supported at both ends by the electrode portions 1a, 1b of the cylindrical power storage body 1. Further, the rotary member 50 coaxially rotates around the cylindrical power storage body 1 in such a manner that the electrode portions 1a, 1b (the insertion portions 54) serve as a rotational center.

The electrode portions 1a, 1b of the cylindrical power storage body 1 are fixed to retaining members 11a, 11b, respectively, through bus bars 12 for electrically connecting the cylinder power storage bodies 1 in parallel or in series, so as to form a power storage module (assembled battery) 10. The cylindrical power storage bodies 1 are arranged in parallel with each other. The end of each pair of the cylindrical power storage body 1 and the rotary member 50, at which the rotary gear 51 is provided, is inserted into a corresponding one of a plurality of holes 13 formed on the retaining member 11b (see FIG. 2). Then, the retaining member 11b and the electrode portion 1b are fixed to each other not to interfere with the rotation of the rotary member 50 (i.e. the rotary gear 51).

Figure 4A:
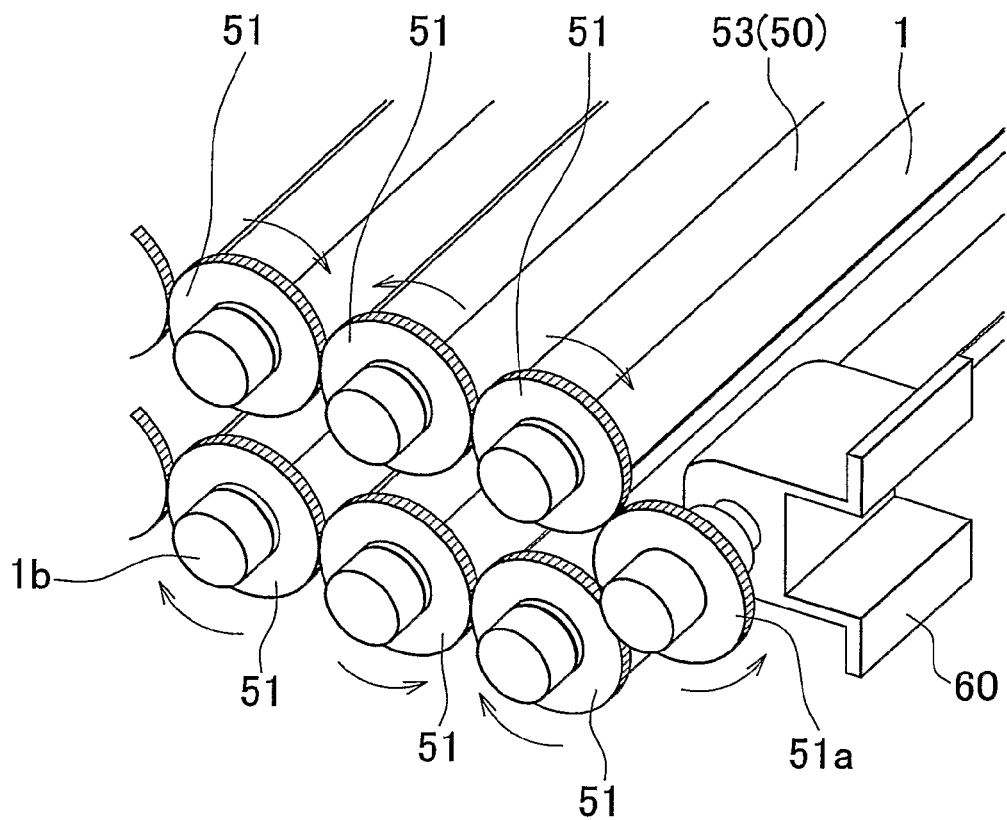
FIGS. 4A, 4B illustrate how the rotary members according to the first embodiment of the invention rotate.

The rotary gear 51 is provided with a gear portion that includes teeth spaced apart at a predetermined pitch in a circumferential direction. The rotary gear 51, which is provided in each of the rotary members 50 disposed around the respective cylindrical power storage bodies 1 in the power storage module 10, includes the gear portion that engages with the gear portion of the adjacent rotary gear 51. When one of each pair of the adjacent rotary gears 51 rotates, the rotation is transmitted to the other rotary gear 51 through the engaged gear portions. Therefore, as shown in FIG. 4A, when a rotary gear 51a provided for the motor 60 is rotated by the drive power generated by the motor 60, the rotary gears 51 that engage with the rotary gear 51a are rotated. At the same time, the other rotary gears 51, which are adjacent to each other and engage with each other, are also rotated. At this time, since the gear portions of the rotary gears 51 adjacent to each other are engaged with each other, the rotary gears 51 adjacent to each other rotate in directions opposite to each other.

Figure 2:
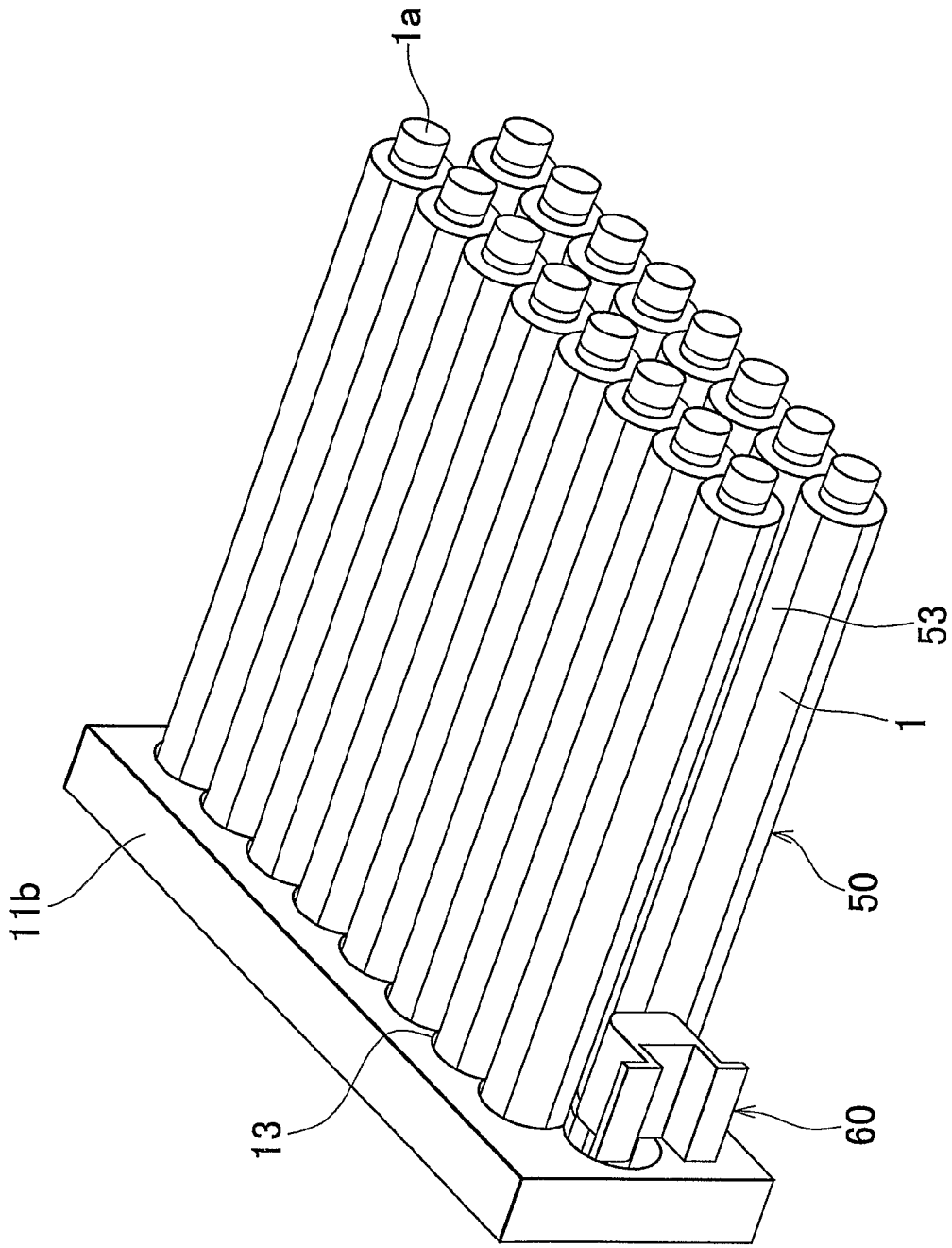
FIG. 2 is a perspective view showing a power storage module according to the first embodiment of the invention.

As shown in FIGS. 2 and 4A, the cylindrical power storage bodies 1 in the first embodiment are disposed in the casing 20 in such a manner that the longitudinal directions of the cylindrical power storage bodies 1 are aligned in parallel with the longitudinal direction of the casing 20. The rotary gears 51 adjacent to each other engage with each other. The cylindrical power storage bodies 1 are arranged in two rows in a vertical direction, and one of the rotary gears 51 in each row, which is adjacent to the rotary gear 51a provided for the motor 60, engages with the rotary gear 51a. Thus, according to this configuration, the single motor can rotate the rotary members 50 arranged in parallel and in the two rows.

As shown in FIG. 2, the motor 60 is fixed to the retaining member 1b by inserting the rotary gear 51a into one of the holes 13 formed on the retaining portion 11b in a manner similar to that in which the cylindrical power storage bodies 1 surrounded by the respective rotary members 50 are fixed to the retaining member 11b. In this way, the cylindrical power storage bodies 1 are arranged in parallel and in the plurality of rows. The rotary gears 51, which are provided in the rotary members 50 at the ends close to the retaining member 11b, engage with each other. Further, at least one of the rotary gears 51 (i.e., at least one rotary gear 51 disposed adjacent to the motor 60, among the rotary gears 51 of the rotary members 50 arranged in parallel with each other) engages with the rotary gear 51a provided for the motor 60. The power storage module 10 thus configured is immersed in the cooling medium 30 filled in the casing 20 and housed in the casing 20.

The casing 20 is provided with a plurality of radiation fins 21 on an outer peripheral surface, and houses the power storage module 10. Further, the casing 20 is filled with the cooling liquid that is used as the cooling medium 30. Therefore, a seal is provided inside the casing 20 so as to seal the cooling liquid in the casing 20 and prevent the cooling liquid from leaking. Examples of the cooling liquid include an automatic transmission fluid, silicone oil, and fluorine inert liquids, such as Fluorinert™, Novec™ HFE (hydrofluoroether), and Novec™ 1230, which are made by 3M Company. The casing 20 is filled with the cooling liquid to its maximum capacity, so that gas, e.g. air, does not enter the casing 20.

The lid member 40 is placed on top of the casing 20 to seal the power storage module 10 and the cooling liquid in the casing 20, and fixed to the casing 20. The casing 20 and the lid member 40 are made of a metal such as aluminum or copper (or an alloy, e.g., aluminum alloy or, a copper alloy). It should be noted that the casing 20 and the lid member 40 may be cylindrically shaped and disc-shaped, respectively, or may have a square/rectangular column shape and a square/rectangular plate shape, respectively.

The power supply device 100 is charged and discharged through a positive terminal and a negative terminal of the power storage module 10 housed in the casing 20. Thus, the power supply device 100 supplies electric power.

Figure 5:
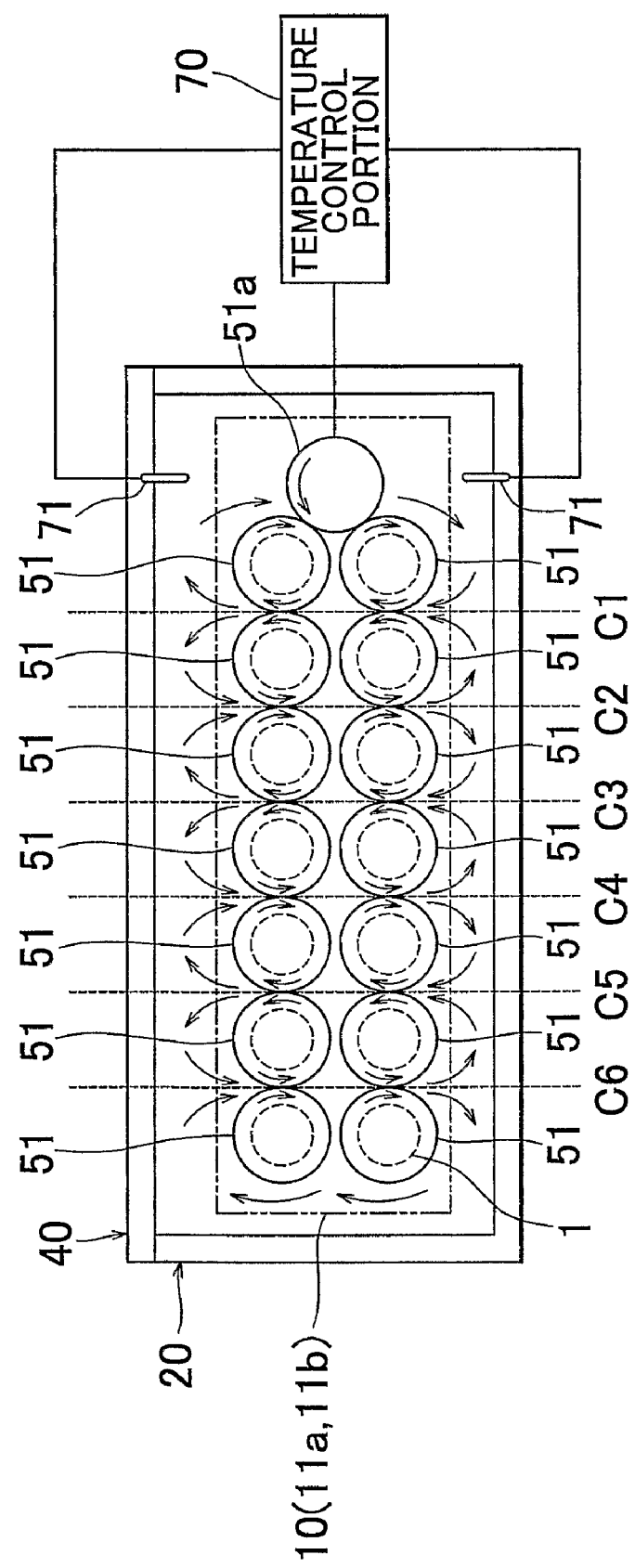
FIG. 5 illustrates how a cooling liquid flows in the power supply device according to the first embodiment of the invention.

FIG. 5 illustrates how the rotary members 50 rotate and how a cooling liquid (i.e. the cooling medium 30) flows in the power supply device 100 according to the first embodiment of the invention. As shown in FIG. 5, the rotary gears 51 adjacent to each other in each row rotate in directions opposite to each other as described above, and therefore the cooling liquid flowing between each pair of the adjacent rotary members 50 in each row is directed in one way as a result of agitating the cooling liquid by the opposite rotations of the adjacent rotary members 50.

For example, when one of the rotary members 50 that is closest to the motor 60 in each row (hereinafter referred to as "first rotary member 50") rotates clockwise, the rotary member 50 adjacent to the first rotary member 50 in each row (hereinafter referred to as "second rotary member 50") rotates counterclockwise. Then, the flow of the cooling liquid between the first and second rotary members 50 (indicated by a line C1 in FIG. 5) is agitated to flow upward in the casing 20, and thus, the upward flow of the cooling liquid is promoted. Further, the second rotary member 50 engages with one of the rotary members 50 that is adjacent to the second rotary member 50 in each row (hereinafter referred to as "third rotary member 50") through the engaged rotary gears 51 of the second and third rotary members 50, and therefore the third rotary member 50 rotates clockwise. Accordingly, the flow of the cooling liquid between the second and third rotary members 50 (indicated by a line C2 in FIG. 5) is agitated to flow downward in the casing 20, and thus, the downward flow of the cooling liquid is promoted.

More specifically, in FIG. 5, flows of the cooling liquid between the rotary members 50 indicated by odd-numbered lines (C1, C3, and C5) are agitated by the rotary members 50 in a direction opposite to that in which flows indicated by even-numbered lines (C2, C4, and C6) are agitated by the rotary members 50. Therefore, the flows of the cooling liquid indicated by the adjacent lines, for example, the line C1 and the line C2, are promoted in directions different from each other.

A flow speed of the cooling liquid flowing in the space between the cylindrical power storage body 1 and the rotary member 50 differs from a flow speed of the cooling liquid flowing outside the rotary member 50, due to the rotation of the rotary member 50. Due to the difference between the flow speeds, the cooling liquid flows out from the space to the outside of the rotary member 50, and flows into the space from the outside of the rotary member 50. More specifically, the flow speed of the cooling liquid flowing outside the rotary member 50 is faster than the flow speed of the cooling liquid flowing in the space between the cylindrical power storage body 1 and the rotary member 50 due to the rotation of the rotary member 50. This speed difference of the cooling liquid generates a pressure difference. Due to the pressure difference, the cooling liquid flows into and out from the space between the cylindrical power storage body 1 and the rotary member 50 through the opening portions 52 (that is, the opening portions 52 equivalent to the clearances between the cover members 53) (see FIG. 4B). It should be noted that the cover members 53 that form the rotary member 50 may be made of a highly heat-conductive material, in such a manner that the heat carried by the cooling liquid in the space between the cylindrical power storage body 1 and the rotary member 50 is efficiently transferred to the cooling liquid outside the rotary member 50. Alternatively, the rotary member 50 (i.e. the cover members 53) may be produced using a material with low heat conductivity and low specific gravity, because the flow of the cooling liquid inside the rotary member 50, that is, the flow of the cooling liquid in the space between the cylindrical power storage body 1 and the rotary member 50, is promoted by the rotation of the rotary member 50 as described above.

In the first embodiment, a temperature sensor 71 detects temperatures of an upper portion and a lower portion of the cooling liquid filled in the casing 20, and a temperature control portion 70 detects, for example, a difference between the temperature of the upper portion and the temperature of the lower portion. When the temperature difference is 2° C. to 5° C., the temperature control portion 70 drives the motor 60 to rotate the rotary members 50.

Thus, in the power supply device 100 according to the first embodiment, the rotary members 50 are provided for the respective cylindrical power storage bodies 1. This configuration makes it possible to promote the flow of the cooling liquid so that the cooling liquid around the cylindrical power storage bodies 1 is well agitated, and further, to keep constant the speed of the flow (convection) of the cooling liquid that contacts the cylindrical power storage bodies 1.

In other words, the flow of the cooling liquid around the cylindrical power storage bodies 1 is promoted, and the flow speed of the portions of the cooling liquid, which contact the cylindrical power storage bodies 1, can be controlled. Therefore, an amount of heat transferred from the cylindrical power storage bodies 1 to the cooling liquid (heat transfer amount between the cylindrical power storage bodies 1 and the cooling liquid) can be kept constant. This also makes it possible to reduce variation in the temperature distribution of the portions of the cooling liquid, which contact the cylindrical power storage bodies 1. As a result, variation in the temperature distribution of the entire cooling liquid can be reduced. Thus, it is possible to equalize the temperature of the cooling liquid in the power supply device 100, and to avoid the situation where the cooling liquid has a strong cooling effect on a part of the power storage bodies 1, and has a weak cooling effect on another part of the cylindrical power storage bodies 1. That is, it is possible to prevent the cooling effect from varying among the cylindrical power storage bodies 1. Accordingly, the rate at which charging and discharging performance deteriorates is made uniform in the entire cylindrical power storage bodies 1. Thus, the stable power supply device 100 can be provided.

Further, according to the first embodiment, as shown in FIG. 5, flows of the cooling liquid between the rotary members 50 indicated by odd-numbered lines (C1, C3, and C5) are agitated by the rotary members 50 in a direction opposite to that in which the flows indicated by even-numbered lines (C2, C4, and C6) are agitated by the rotary members 50. Therefore, the flows of the cooling liquid indicated by the adjacent lines, for example, the line C1 and the line C2, are promoted in directions different from each other. Accordingly, as compared to the case where the flow of the cooling liquid around the entire power storage module 10 is promoted, the flowability of the cooling liquid can be further improved in the power storage module 10 in which the cylindrical power storage bodies 1 are disposed close together. This makes it possible to reduce the difference between the temperature of the cooling liquid inside of the power storage module 10 and the temperature of the cooling liquid of the outer peripheries of the power storage module 10.

Further, each of the rotary gears 51 includes the gear portion that engages with the gear portion of the adjacent rotary gear 51. When one of each pair of the adjacent rotary gears 51 rotates, the rotation is transmitted to the other rotary gear 51 through the engaged gear portions. Therefore, this configuration makes it possible to reduce the number of power sources used for rotating the rotary members 50, thereby reducing the number of components and cost. Further, the rotary gear 51a provided for the motor 60 engages with the adjacent rotary gears 51 among the rotary gears 51 arranged in two rows in the vertical direction, and the single motor (i.e. the motor 60) rotates all the rotary gears 51 arranged in the two rows in the vertical direction. Therefore, it is possible to further reduce the number of components and cost.

Figure 6:
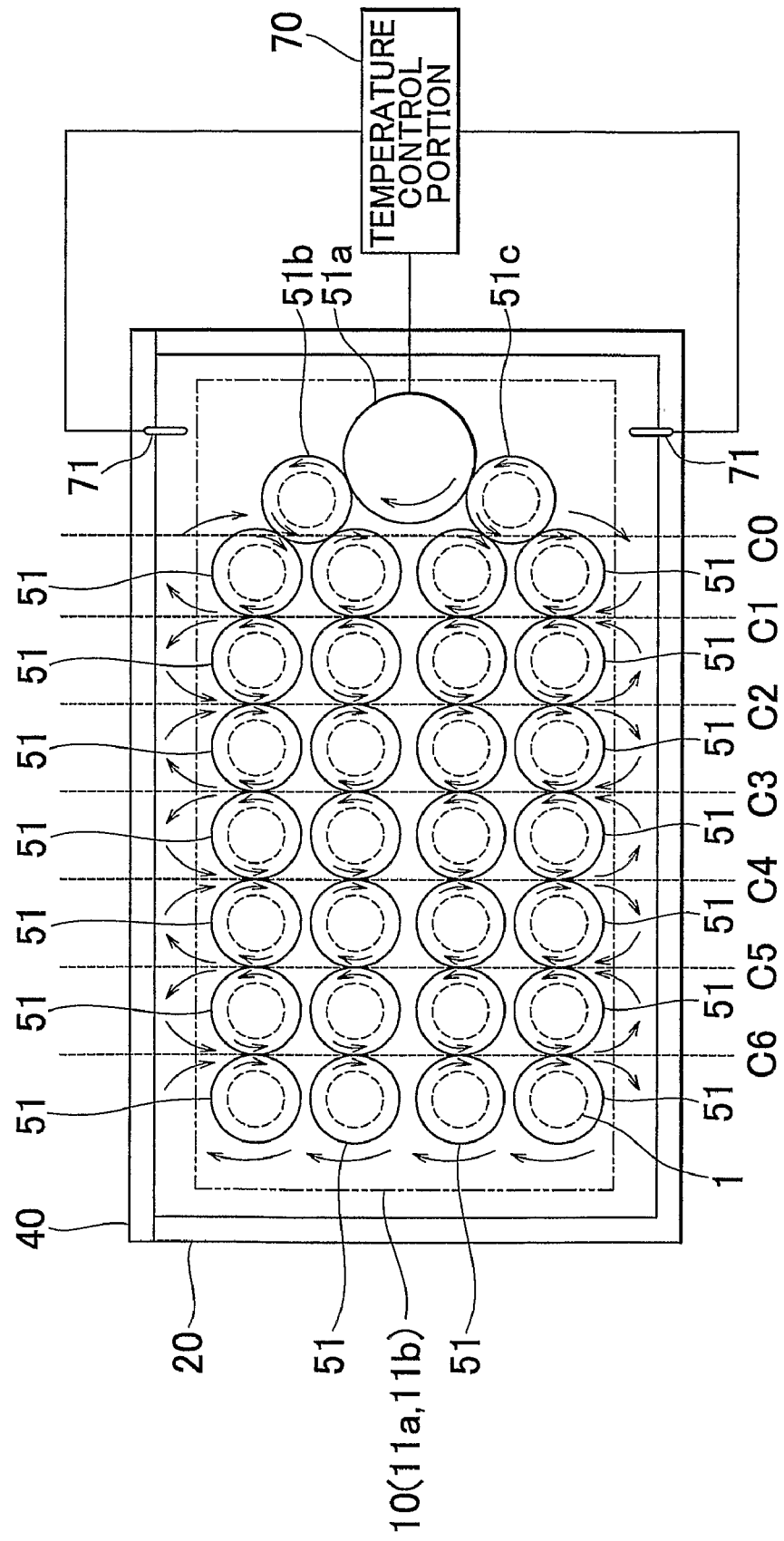
FIG. 6 illustrates how the cylindrical power storage bodies and a motor are disposed and how the cooling liquid flows in the power supply device according to the first embodiment of the invention.

FIG. 6 shows a modification example of the power storage module 10 in which the cylindrical power storage bodies 1 shown in FIGS. 2 and 4 are arranged in four rows in the vertical direction. In this case, one of the rotary members 50 includes a rotary gear 51b that engages with the rotary gear 51 disposed at the end of each of the upper two rows. Further, another one of the rotary members 50 includes a rotary gear 51c that engages with the rotary gear 51 disposed at the end of each of the lower two rows. The rotary gears 51b, 51c engage with the rotary gear 51a provided for the motor 60. This configuration makes it possible to rotate all the rotary members 50 that are arranged in parallel and in the plurality of rows, by one motor, i.e., the motor 60.

Figure 7A:
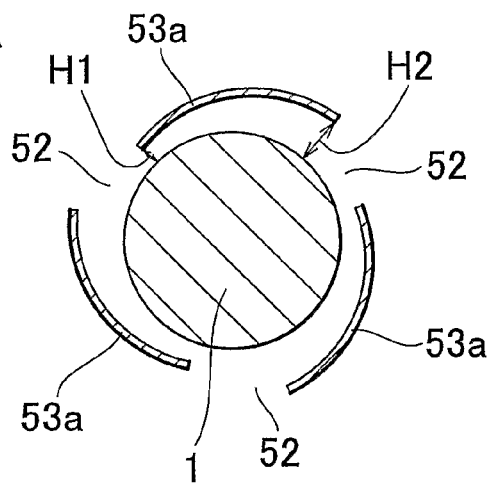
FIGS. 7A to 7C are sectional views showing cylindrical power storage bodies and respective rotary members according to a second embodiment.
Figure 7B:
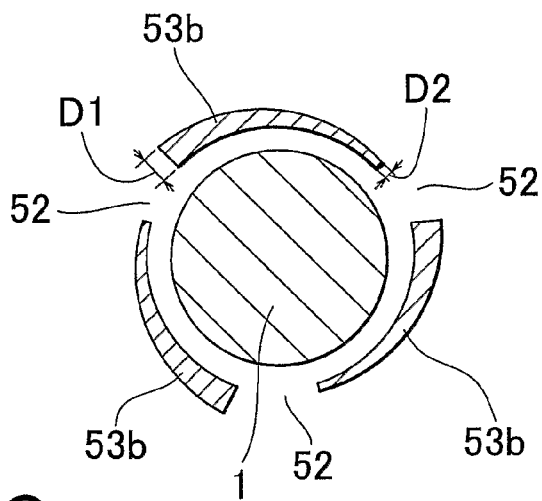
Figure 7C:
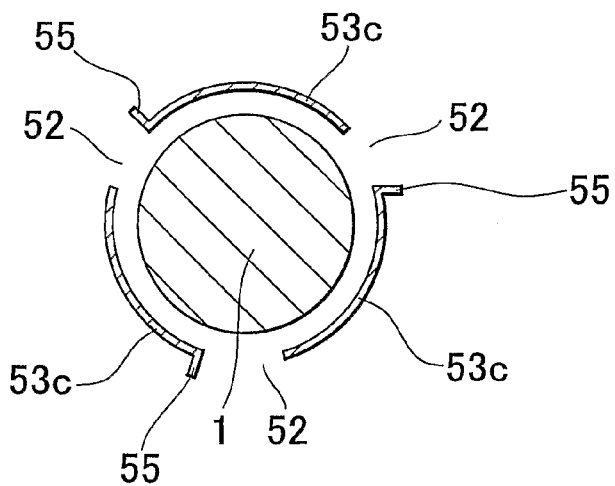

Each of FIGS. 7A to 7C shows a sectional view of the rotary member 50 in the power supply device 100 according to a second embodiment of the invention. The arrangements and the sectional shapes of the cover members 53 constituting the rotary member 50 in the second embodiment differ from those of the cover members 53 constituting the rotary member 50 in the first embodiment.

FIG. 7A shows cover members 53a that extend in the lengthwise direction of the cylindrical power storage body 1, and are disposed at predetermined intervals to surround the cylindrical power storage body 1. Each of the cover members 53a is formed and disposed in such a manner that a first distance H1, which is the distance between the cylindrical power storage body 1 and the cover member 53a at a first position in the cover member 53a, differs from a second distance H2, which is the distance between the cylindrical power storage body 1 and the cover member 53a at a second position in the cover member 53a, in the sectional view as shown in FIG. 7A.

More specifically, the distance between the cylindrical power storage body 1 and each of the cover members 53a at the first position differs from the distance between the cylindrical power storage body and the cover member 53a at the second position. Each of the cover members 53a is disposed in such a manner that a tangent line of the cover member 53a at the first position is angled with respect to a tangent line of the cylindrical power storage body 1 at the first position, and the tangent line of the cover member 53a, at the second position is angled with respect to the tangent line of the cylindrical power storage body 1 at the second position as well, in the sectional view as shown in FIG. 7A. The angle between the tangent line of the cover member 53a at the first position and the tangent line of the cylindrical power storage body 1 at the first position is different from the angle between the tangent line of the cover member 53a at the second position and the tangent line of the cylindrical power storage body 1 at the second position. That is, the distance between the cover member 53a and the cylindrical power storage body 1 is not constant in a circumferential direction.

FIG. 7B shows the rotary member 50 including cover members 53b. Each of the cover members 53b is formed in such a manner that the distance between the cover member 53b and the cylindrical power storage body 1 is constant in the circumferential direction, and the shape of the cover member 53a at a first position differs from the shape of the cover member 53a at a second position, in the sectional view of the cover member 53b as shown in FIG. 7B. In other words, the cover member 53b is formed such a manner that a thickness D1 of the cover member 53b at the first position is larger (or smaller) than a thickness D2 at the second position, in the sectional view as shown in FIG. 7B.

Figure 4B:
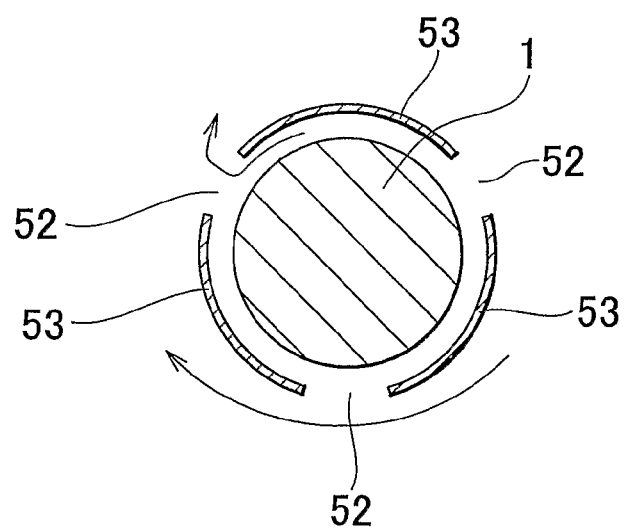

FIG. 7C shows the rotary member 50 including cover members 53c. Each of the cover members 53c is formed by providing a protrusion portion 55 in the cover member 53 as shown in FIG. 4B at one end on an outer surface.

In the second embodiment, modifications are made to the arrangements and the sectional shapes of the cover members 53 constituting the rotary member 50 according to the first embodiment. These modifications make it possible to effectively promote the flow of the cooling liquid around the cylindrical power storage bodies 1 and the rotary members 50. Accordingly, it is possible to reduce the variation in the temperature distribution of the portions of the cooling liquid, which contact the cylindrical power storage bodies 1.

In the embodiments as described above, the rotary gear 51 provided in each of the rotary members 50 engages with the adjacent rotary gear 51, and therefore the rotary members 50 adjacent to each other rotate at the same speed. However, the invention is not limited to this configuration. For example, the rotary gears 51 may include the gear portions with different number of teeth, so that the rotary members 50 rotate at different speeds.

Further, in order to improve the effect of agitating the cooling liquid around the cylindrical power storage bodies 1, other configurations of the rotary member (i.e., cover members 53) may be employed, in addition to those shown in FIGS. 7A to 7C. For example, a groove or a protrusion may be provided on an outer surface or an inner surface of the rotary member 50 (i.e. the cover members 53) to further promote the flow of the cooling liquid. More specifically, for example, a protrusion portion may be continuously formed in a spiral shape on the surface of the rotary member 50 (i.e., the cover members 53) to further promote the flow of the cooling liquid.

Further, in the embodiments as described above, a rotational speed of the rotary members 50 (that is, a rotational speed of the motor 60) may be set to approximately 100 rpm or lower. This is because even when the cooling liquid that contacts the cylindrical power storage bodies 1 flows at the flow speed of several centimeters per second, the sufficient effect of cooling the cylindrical power storage bodies 1 and sufficient effect of agitating the cooling liquid can be achieved, because the cooling liquid has higher heat conductivity than that of cooling gas.

In the embodiments as described above, the rotary member 50 coaxially rotates around the corresponding cylindrical power storage body 1 in such a manner that the electrode portions 1a, 1b (the insertion portions 54) serve as a rotational center. However, the rotary member 50 may be formed in such a manner that the rotational axis of the rotary member 50 is eccentric with respect to an axis of the cylindrical power storage body 1 in a longitudinal direction. More specifically, when the rotary member 50 eccentrically rotates around the cylindrical power storage body 1, the distance between the cylindrical power storage body 1 and the rotary member 50 varies. Accordingly, the rotary member 50 can agitate the cooling liquid more efficiently, and moreover, the cooling liquid in the space between the cylindrical power storage body 1 and the rotary member 50 is pushed out from the space to the outside of the rotary member 50. This further promotes the flow of the cooling liquid in the space between the cylindrical power storage body 1 and the rotary member 50.

The aforementioned embodiments are described using the power storage body, such as a battery cell or an electric double-layer capacitor (condenser), as one example. However, the invention may be applied to, for example, a fuel cell.

The invention claimed is:

1. A power supply device, comprising:
   a casing containing a cooling medium;
   a plurality of cylindrical power storage bodies disposed in the casing; and
   a plurality of rotary members, each of the rotary members surrounding one of the power storage bodies, wherein at least one rotary member of the plurality of rotary members rotates.

2. The power supply device according to claim 1, further comprising;
   a drive portion that rotates at least one rotary member of the plurality of rotary members, wherein each of the rotary members includes a drive power transmission portion.

3. The power supply device according to claim 2, wherein the at least one rotary member that the drive portion rotates is a first rotary member, and the first rotary member rotates the other rotary members of the plurality of rotary members through the drive power transmission portion.

4. The power supply device according to claim 3, wherein:
   the plurality of rotary members are arranged in parallel with each other; and
   the first rotary member is disposed adjacent to the drive portion.

5. The power supply device according to claim 4, wherein the plurality of rotary members are further arranged in a plurality of rows, and the plurality of rotary members are all rotated by the one drive portion.

6. The power supply device according to claim 2, wherein each of the rotary members adjacent to each other rotate in directions opposite to each other.

7. The power supply device according to claim 6, wherein each power storage body includes electrode portions, and each of the rotary members is axially supported by the electrode portions of the corresponding cylindrical power storage body, wherein the electrode portions serve as a rotational center.

8. The power supply device according to claim 6, wherein each of the rotary members includes a rotational axis that is not co-linear to an axis of the corresponding cylindrical power storage body, and each rotary member eccentrically rotates around the cylindrical power storage body.

9. The power supply device according to claim 1, wherein:
   a space is formed between each rotary member and the corresponding cylindrical power storage body and the cooling liquid flows into the space; and
   each rotary member is provided with an opening portion through which the cooling liquid flows into and out of the space.

10. The power supply device according to claim 9, wherein a flow speed of the cooling liquid flowing outside each of the rotary members differs from a flow speed of the cooling liquid flowing inside each of the rotary members due to rotation of each rotary member, and the cooling liquid flows into and out of the space through the opening portion due to a difference between the flow speeds.

11. The power supply device according to claim 1, wherein each of the rotary members extends in a lengthwise direction of the corresponding cylindrical power storage body, and each rotary member is formed by a plurality of cover members that are disposed at predetermined intervals to surround the corresponding cylindrical power storage body.

12. The power supply device according to claim 11, wherein a distance between each cover member and the corresponding cylindrical power storage body at a first position differs from a distance between each cover member and the corresponding cylindrical power storage body at a second position.

13. The power supply device according to claim 11, wherein a shape of each cover member at a first position differs from a shape of each cover member at a second position, in a sectional view of each cover member.

14. The power supply device according to claim 11, wherein each of the cover members includes a protrusion portion that protrudes toward an outside.

15. The power supply device according to claim 11, wherein each of the cover members includes at least one of a groove and a protrusion, which is formed on at least one of an outer surface and an inner surface of the cover member.

16. The power supply device according to claim 1, further comprising:
   a temperature sensor that detects a temperature of an upper portion of the cooling liquid and a temperature of a lower portion of the cooling liquid; and
   a temperature control portion that drives a drive portion to rotate at least one rotary member when a difference between the temperature of the upper portion and the temperature of the lower portion is equal to a predetermined value.

17. The power supply device according to claim 1, wherein each rotary member comprises a rotary gear at one end thereof.

18. The power supply device according to claim 17, wherein a first rotary gear has a first number of teeth and a second rotary gear has a second different number of teeth, such that the first and second rotary gears rotate at different speeds.

19. A power supply device, comprising:
   a power storage module that includes a plurality of cylindrical power storage bodies;
   a casing that houses the power storage module;
   a cooling medium that is filled in the casing;
   a lid member that covers the casing and seals the power storage module and the cooling medium in the casing;
   rotary members that are disposed to surround the respective cylindrical power storage bodies, and that rotate around the respective cylindrical power storage bodies; and
   a drive portion that rotates the rotary members.

20. The power supply device according to claim 19, further comprising:
   a temperature sensor that detects a temperature of an upper portion of the cooling medium and a temperature of a lower portion of the cooling medium; and
   a temperature control portion that drives the drive portion when a difference between the temperature of the upper portion and the temperature of the lower portion is equal to a predetermined value.

* * * * *